(12) United States Patent
Winkler

(10) Patent No.: US 12,735,910 B2
(45) Date of Patent: Sep. 15, 2026

(54) UNDERWATER CLEANING ROBOT

(71) Applicant: MARINER 3S AG, Remigen (CH)

(72) Inventor: Roland Winkler, Wil AG (CH)

(73) Assignee: MARINER 3S AG, Remigen (CH)

( * ) Notice: Subject to any disclaimer, the term of this patent is extended or adjusted under 35 U.S.C. 154(b) by 71 days.

(21) Appl. No.: 18/710,757

(22) PCT Filed: Dec. 1, 2022

(86) PCT No.: PCT/EP2022/084033
§ 371 (c)(1),
(2) Date: May 16, 2024

(87) PCT Pub. No.: WO2023/104628
PCT Pub. Date: Jun. 15, 2023

(65) Prior Publication Data

US 2025/0012106 A1 Jan. 9, 2025

(30) Foreign Application Priority Data

Dec. 6, 2021 (EP) .................................... 21212476

(51) Int. Cl.
*E04H 4/16* (2006.01)
*G01S 15/93* (2020.01)
(Continued)

(52) U.S. Cl.
CPC ............ *E04H 4/1654* (2013.01); *G01S 15/93* (2013.01); *G05D 1/2274* (2024.01); *G05D 1/852* (2024.01);
(Continued)

(58) Field of Classification Search
CPC .... E04H 4/1654; G05D 1/852; G05D 1/2274; G05D 2107/29; G05D 2111/20; G05D 2109/38; G05D 2105/10; G01S 15/93
(Continued)

(56) References Cited

U.S. PATENT DOCUMENTS 3,675,261 A 7/1972 Burgess et al.
5,569,371 A 10/1996 Perling
(Continued)

FOREIGN PATENT DOCUMENTS

DE 27 26 577 A1 5/1978
EP 3 282 071 B1 2/2019
(Continued)

OTHER PUBLICATIONS

International Search Report in PCT/EP2022/084033, mailed Mar. 16, 2023.

(Continued)

*Primary Examiner* — Mahmoud S Ismail
(74) *Attorney, Agent, or Firm* — Collard & Roe, P.C.

(57) ABSTRACT

An underwater cleaning robot contains a movement device for moving the underwater cleaning robot under water, a cleaning device for cleaning an object located under water, a control device for controlling the movement device and/or the cleaning device and a communication device for receiving and/or transmitting signals from outside the underwater cleaning robot and vice versa. The communication device contains a first ultrasonic transducer for receiving ultrasonic signals transmitted under water and is designed to transmit electrical signals, corresponding to the ultrasonic signals received, to the control device.

18 Claims, 3 Drawing Sheets

(51) Int. Cl.

| | |
|---|---|
| ***G05D 1/00*** | (2024.01) |
| ***G05D 1/227*** | (2024.01) |
| ***G05D 1/85*** | (2024.01) |
| *G05D 105/10* | (2024.01) |
| *G05D 107/00* | (2024.01) |
| *G05D 109/30* | (2024.01) |
| *G05D 111/20* | (2024.01) |

(52) U.S. Cl.
CPC ..... *G05D 2105/10* (2024.01); *G05D 2107/29* (2024.01); *G05D 2109/38* (2024.01); *G05D 2111/20* (2024.01)

(58) Field of Classification Search
USPC ........................................................... 701/21
See application file for complete search history.

(56) References Cited

U.S. PATENT DOCUMENTS

| | | | | |
|---|---|---|---|---|
| 8,403,218 | B1 * | 3/2013 | Austin | H04B 11/00<br>235/435 |
| 2013/0318728 | A1 * | 12/2013 | Bernini | E04H 4/1654<br>15/1.7 |
| 2018/0044936 | A1 | 2/2018 | Torem et al. | |
| 2018/0292819 | A1 * | 10/2018 | So | A47L 9/2857 |
| 2019/0011928 | A1 * | 1/2019 | Ouyang | G05D 1/0212 |
| 2022/0042337 | A1 * | 2/2022 | Newman | E04H 4/1654 |
| 2024/0183183 | A1 * | 6/2024 | Witelson | E04H 4/1654 |

FOREIGN PATENT DOCUMENTS

| | | | |
|---|---|---|---|
| JP | S53-2954 | A | 1/1978 |
| JP | H10-79708 | A | 3/1998 |
| JP | 2010-082353 | A | 4/2010 |
| JP | 2018-514433 | A | 6/2018 |
| JP | 2018-182701 | A | 11/2018 |
| KR | 10-2011-0062248 | A | 6/2011 |
| WO | 2016/149199 | A1 | 9/2016 |
| WO | 2022/032103 | A1 | 2/2022 |

OTHER PUBLICATIONS

English Translation of South Korean Office Action in KR 10-2024-7017406, mailed Sep. 29, 2025.

Notice of Reasons for Refusal Issued in Japanese Patent Application No. 2024-533798 Dated Nov. 5, 2025 (with English translation).

* cited by examiner 15
11
13
10
31
100
32
3
2
39
27
24
26
25
23
7
20
1
23
24

UNDERWATER CLEANING ROBOT

CROSS REFERENCE TO RELATED APPLICATIONS

This application is the National Stage of PCT/EP2022/084033 filed on Dec. 1, 2022, which claims priority under 35 U.S.C. § 119 of European Application No. 21212476.2 filed on Dec. 6, 2021, the disclosure of which is incorporated by reference. The international application under PCT article 21(2) was not published in English.

The present invention relates to an underwater cleaning robot and to a method for controlling it.

Underwater cleaning robots are used to clean swimming pools more or less automatically. Generally, a cleaning robot is pushed to the edge of the pool on a special cart, from where it is lowered into the water. The robot then descents automatically and independently and systematically travels the pool floor and sometimes the pool walls. In doing so, it pulls a cable behind it for the power supply and for accepting commands that it receives from the operating personnel outside the pool. Furthermore, software is used to prevent the robot from getting tangled up in its own cables or from driving around water islands and blocking itself in the process. At the end of the cleaning process, the robot resurfaces automatically at the point where it was lowered into the water or the surfacing function is activated, after which the robot is usually pulled out of the water manually. From there, it is loaded back onto the delivery cart and driven away. Thereafter, the water filters are cleaned.

Usually, the entire process is completely automatic, so that the operating personnel only needs to bring the robot to the water and lower it into the water and, conversely, pull it out of the water again and load it onto the delivery cart and to clean the filters after the cleaning process.

The object of the present invention is to provide an improved underwater cleaning robot and an improved method for controlling it, in which problems that may occur, such as the tangling or blocking described above, can be avoided by means of a trailing cable.

The object is achieved by an underwater cleaning robot according to claim 1, a system according to claim 5 and a method according to claim 8, respectively. Refinements of the invention are given in the subclaims. The methods can also be refined by the features of the devices listed below or in the subclaims, or vice versa, and each of the features of the methods and/or the devices, respectively, can also be used in combination for refinements.

An underwater cleaning robot according to the invention includes a movement device for moving the underwater cleaning robot under water, a cleaning device for cleaning an object located under water, a control device for controlling the movement device and/or the cleaning device, and a communication device for receiving signals from outside the underwater cleaning robot. The bidirectional communication device includes a first ultrasonic transducer for receiving and transmitting ultrasonic signals transmitted under water and is designed to transmit electrical signals corresponding to the received ultrasonic signals to the control device and, conversely, to transmit ultrasonic signals from under water to the communication device outside the pool.

With such an underwater cleaning robot it is possible, for example, to avoid the problems that may occur due to a trailing cable, such as the tangling or blocking described above.

Further features and functionalities of the invention are apparent from the description of exemplary embodiments with reference to the accompanying drawings.

In the following, embodiments of the present invention will be described with reference to the accompanying drawings.

Figure 1:
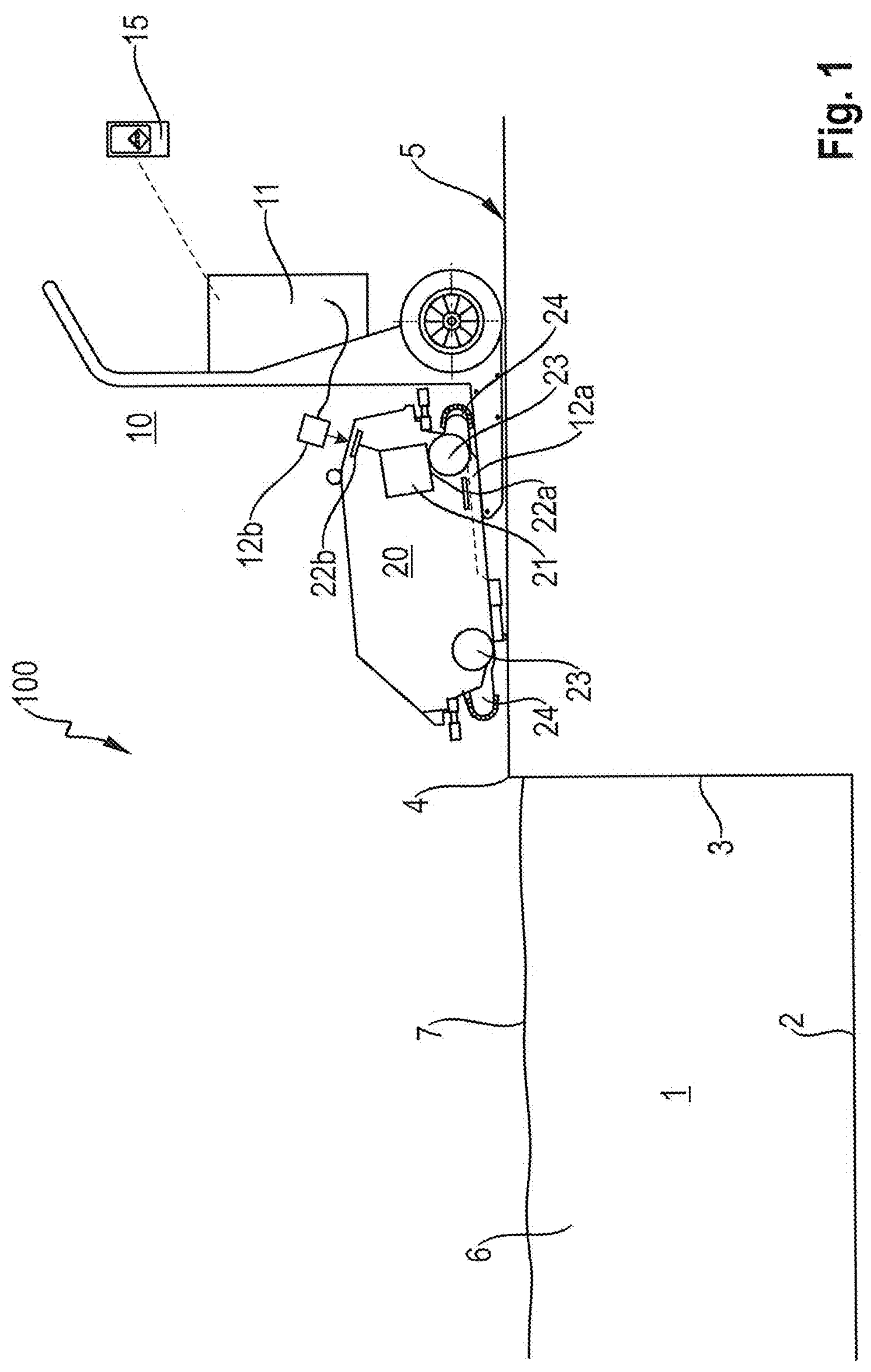
FIG. 1 shows an underwater cleaning system according to a first embodiment in a state in which an underwater cleaning robot is arranged on a cart at a pool edge of a pool.

FIG. 1 shows an underwater cleaning system 100 according to a first embodiment. A pool 1 has a bottom 2 and a side wall 3. The pool 1 can be, for example, a tiled, foiled or concreted pool or a chrome steel pool. A pool edge 4 forms a transition between the side wall 3 and a ground 5 surrounding the pool. The pool 1 is filled with water 6 such that a water surface 7 lies just below the pool edge 4.

In the state shown in FIG. 1, a cart 10, on which an underwater cleaning robot 20 is loaded, is arranged on the ground 5 near the edge 4 of the pool.

The cart 10 is designed, for example, as a transport trolley. In addition to the elements serving to hold and transport the underwater cleaning robot 20, it includes a control unit 11 and one or more charging connections 12 for the underwater cleaning robot 20. As an example, FIG. 1 shows a charging plate 12*a*, on which the underwater cleaning robot 20 sits and which in this state is in contact with a corresponding charging contact 22*a* of the underwater cleaning robot 20, as well as a charging plug 12*b*, which can be connected to a corresponding charging socket 22*b* of the underwater cleaning robot 20.

Operating the control unit can be carried out on the control unit itself or via a remote control unit 15. The control unit 11 includes a modem 13 or is connected to a modem 13.

The underwater cleaning robot 20 includes a battery 21 which is designed to emit electrical energy. The battery 21 is designed, for example, as a rechargeable accumulator. It is connected to one or more charging connections, for example the charging contact 22*a* and/or the charging socket 22*b*, and can be charged via these.

Furthermore, the underwater cleaning robot 20 includes a movement device 23, which is designed for moving the underwater cleaning robot 20 under water, and a cleaning device 24 for cleaning an object located under water, for example the bottom 2 and the side wall 3 of the pool 1. The movement device 23 and the cleaning device 24 are supplied with energy by the battery 21.

The movement device 23 is schematically illustrated in FIG. 1 by wheels, tracks or rollers and the cleaning device 24 by brush rollers. For example, static brushes, high-pressure devices or suction devices are also possible. However, the present invention is not limited thereto and can be applied to underwater cleaning robots 20 with any movement and cleaning devices.

Figure 2:
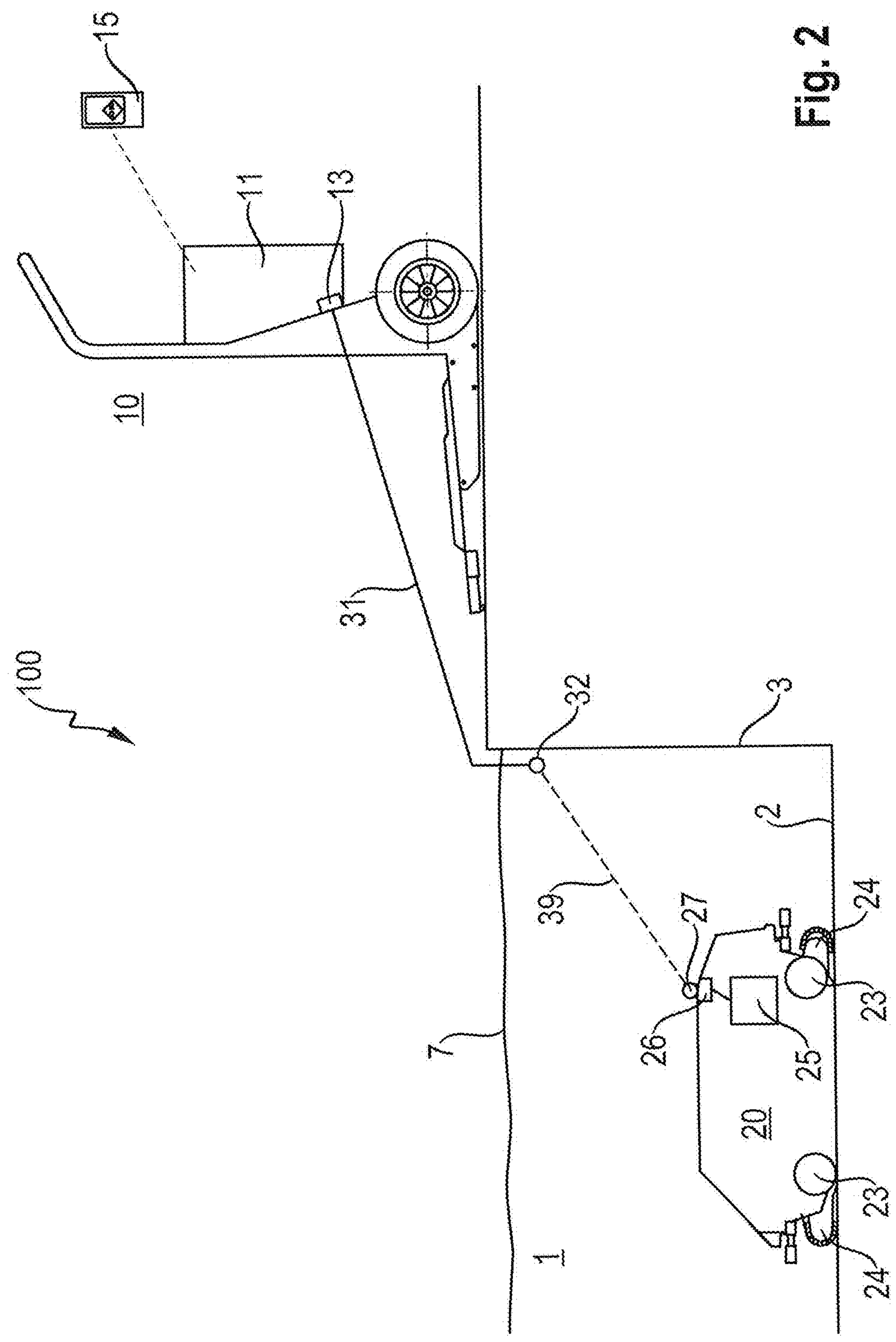
FIG. 2 shows the underwater cleaning system according to the first embodiment in a state in which the underwater cleaning robot is arranged on a bottom of the pool.

As can be seen in FIG. 2, the underwater cleaning robot 20 further includes a control device 25 which is used for controlling the movement device 23 and/or the cleaning device 24. The control device 25 includes a modem 26 or is connected to a modem 26. The modem 26 is connected to an ultrasonic transducer 27 attached to the outside of the underwater cleaning robot 20.

FIG. 2 shows a state in which the underwater cleaning robot 20 is arranged on the bottom 2 of the pool 1.

In operation, the battery 21 of the underwater cleaning robot 20 is first charged via the charging connections 22. Then, the underwater cleaning robot 20 is moved by means of the cart 10 on the ground 5 to the edge 4 of the pool. Thereafter, the underwater cleaning robot 20 is lowered to the bottom 2 of the pool 1. The cleaning robot can also be navigated over a short distance into the water using the radio remote control from outside the water.

An ultrasonic transducer 32 is arranged below the water surface 7 in the pool 1 and connected to the modem 13 of the cart 10 via a cable 31.

Figure 3:
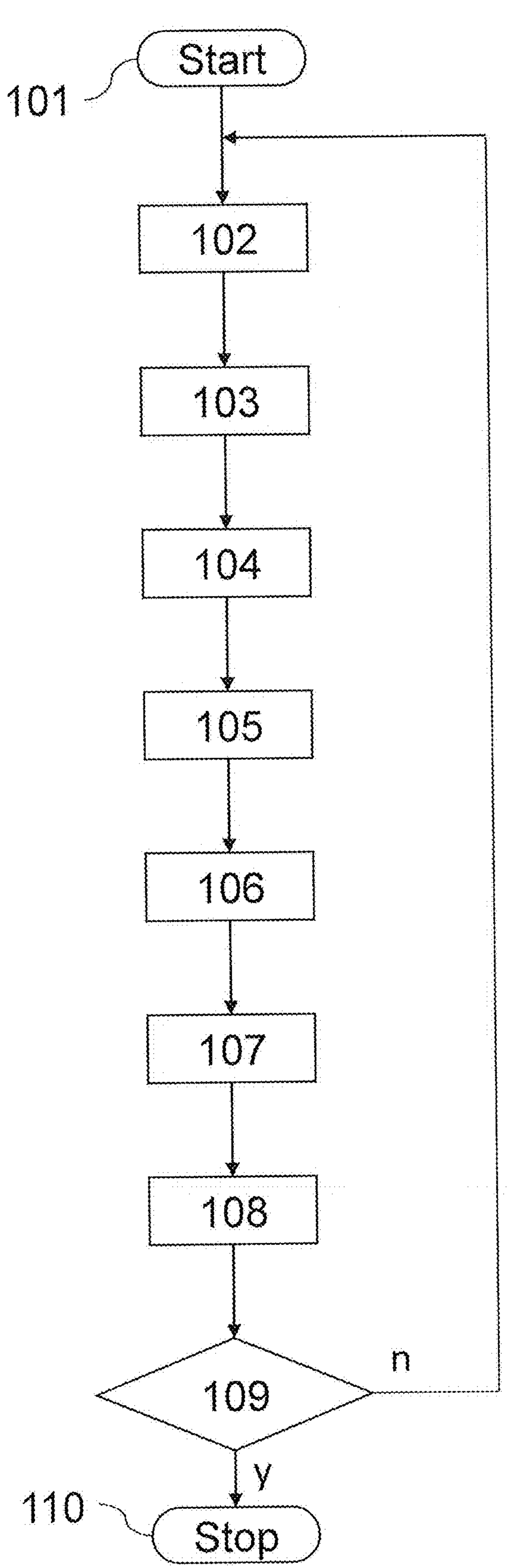
FIG. 3 shows a flowchart for a method for controlling an underwater cleaning robot in the underwater cleaning system according to the first embodiment.

Driven by the electrical energy supplied by the battery 21, the underwater cleaning robot 20 moves underwater by means of the movement device 23. For example, it moves along the bottom 2 of the pool 1 and cleans it by means of the cleaning device 24. The underwater cleaning robot 20 is controlled from the control unit 10 of the cart via the control device 25 of the underwater cleaning robot 20. FIG. 3 shows a flow diagram of the sequence of this control:

The sequence starts in step 101.

In step 102, control commands and/or data are generated in the control unit 11.

In step 103, the control commands and/or data are modulated by the modem 13 and transmitted as electrical signals to the ultrasonic transducer 32 via the cable 31.

In step 104, the electrical signals are converted into ultrasonic signals by the ultrasonic transducer 32 and emitted into the water 6.

In step 105, the ultrasonic signals are transmitted via an underwater ultrasonic path 39.

In step 106, the ultrasonic signals are received by the ultrasonic transducer 27 of the underwater cleaning robot 20 and converted back into electrical signals.

In step 107, the electrical signals are demodulated by the modem 13 and transmitted to the control device 25 of the underwater cleaning robot 20.

In step 108, the control device 25 of the underwater cleaning robot 20 performs a control according to the received electrical signals.

In step 109, a check is performed to determine whether the command has been executed and whether the cleaning operation has been completed.

When the cleaning process is completed (y=yes), the control sequence is terminated in step 110, otherwise (n=no) the sequence jumps back to step 102.

The control sequence is designed such that the underwater cleaning robot 20 returns at the end to the point at which it was lowered into the water. There, it resurfaces, is loaded onto the cart 10 and driven away. Subsequently, any necessary maintenance and servicing work is carried out, for example cleaning the water filters and recharging the battery.

Communication between the control unit 11 at the pool edge 4 and the underwater cleaning robot 20 in the pool 1 is preferably carried out via ultrasonic signals in a frequency band preferably between 10 kHz and 400 kHz, which is suitable for propagation in differently treated water, more preferably from approx. 40 to 55 kHz, most preferably at approx. 50 KHz.

In doing so, a maximum communication distance of 60 to 80 m without line of sight or, respectively, more than 100 m with line of sight could be achieved during tests in different swimming pools. The achievable distance depends mainly on the shape of the pool, the pool materials and the composition of the water.

Due to the modulation in the modem 13, the control commands and/or data generated by the control unit 11 are converted into a form suitable for transmission. As modulation for the data and commands to be transmitted, for example, a multi-tone modulation, which is also referred to as orthogonal frequency division multiplexing (OFDM), with, for example, 50 tones at intervals of approx. 100 Hz can be selected, wherein each individual tone can be modulated with a standard modulation such as frequency shift keying (FSK) with a deviation of approx. 25 Hz.

This type of combination of modulations is designed for robust communication with long reverberation and Doppler frequency shifts up to 25 Hz. In a chrome steel bath, for example, there is a reverberation of a few 100 ms, and the mentioned range for Doppler frequency shifts took into account real water currents, for example near water nozzles, and common robot speeds in underwater cleaning.

Communication can be, for example, half-duplex with two-way data transmission in 2 separate frequency bands of 5 kHz bandwidth each or simplex with two-way data transmission in a single frequency band of 10 kHz.

During transmission, small data packets, for example with approx. 30 info bits, are exchanged to control and monitor the robots. The latency of the data packets is significantly less than 1 second.

For example, a data packet consists of a 50-bit multitone lasting 100 to 200 ms and can be efficiently demodulated by means of the fast Fourier transformation (EFT). The 30 info bits in a data packet can be protected against transmission errors using forward error correction (EEC), for example with the help of Bose-Chaudhuri-Hocquenghem codes (BCH codes) with approx. 20 additional bits. In addition, a cyclic redundancy check (CRC) can be provided to detect unrecognized transmission errors.

After sending a data packet, a guard time of approx. 200 ms or the decay of the reverberation has to be awaited before a data packet can be sent again in the same half-band.

By equipping the underwater cleaning robot with a battery as an energy source and wireless communication via ultrasonic signals, this underwater cleaning system can avoid the problems that may occur with a trailing cable, such as the tangling or blocking described above. The underwater cleaning robot has maximum freedom of movement, allowing automatic, comprehensive cleaning of a pool, even in difficult pool shapes with fixtures and islands.

Wireless underwater communication with ultrasound has proven to be particularly advantageous here. Similar to the transmission from the control unit to the underwater cleaning robot described above, transmission can also take place in the opposite direction.

In general, single-beam or multi-beam transducers can be used as ultrasonic transducers. Multi-beam transducers can be used to increase the beam angle up to an omnidirectional transducer that emits in all directions.

The underwater cleaning robot can be programmed such that when the reception becomes too weak or fails, it turns around and returns to where it had better reception before. It can also be programmed to stop if communication is interrupted (e.g., due to a power failure in the control unit) and wait until a signal is available again. Furthermore, it can also be programmed to automatically return to the starting position once cleaning is complete. Furthermore, it can also be programmed such that it automatically returns to the starting position in the case where the remaining battery capacity falls below a predetermined value.

The ultrasonic signals can also be used for distance measurements and to support the navigation of the underwater cleaning robot in the pool. For example, the underwater cleaning robot can use the transmitted and received ultrasonic signals to determine a distance to the side wall of the pool and turn around automatically when close to the wall. For example, it can also use multiple measurements to detect whether the side wall is straight and align itself accordingly, or whether it has any free form.

Furthermore, ultrasonic transducers can also be used to collect data relating to water and pool quality. In this way, for example, certain reference data can be determined and compared before and after cleaning. For example, reference data can be obtained through a teaching process under defined conditions (clean pool and water) and corresponding messages can be issued and/or measures can be initiated in the event of a deviation.

For the underwater cleaning robot to surface, for example, air can be sucked in from above the water surface and pumped into a surfacing bell. This can be done using an air pump via a hose whose free end is held above the water surface by a buoy. Alternatively, compressed air can be released into the surfacing chamber using an air expansion cartridge or similar in the robot.

For descending, the air in the surfacing bell can be evacuated, for example, by a suction pump of the underwater cleaning robot used for cleaning. As a result, the underwater cleaning robot can first be brought to a defined floating state on the water surface and subsequently gently lowered to the bottom.

The invention claimed is:

1. A system for underwater cleaning, including an underwater cleaning robot operating below a water surface, the underwater cleaning robot comprising:

a movement device for moving the underwater cleaning robot under water, a cleaning device for cleaning an object located under water, a control device for controlling the movement device and/or the cleaning device, and a communication device for receiving and/or transmitting signals from outside the underwater cleaning robot, and vice versa, wherein the communication device includes a first ultrasonic transducer for receiving ultrasonic signals transmitted under water, and wherein the communication device is designed to transmit electrical signals corresponding to the received ultrasonic signals to the control device, a control unit for controlling the underwater cleaning robot, the control unit being arranged outside the water, a second ultrasonic transducer arranged below the water surface, which is connected to the control unit, for converting signals output by the control unit into ultrasonic signals and for emitting the ultrasonic signals under water, and a modem, which is included in or connected to the control unit, for modulating the signals output by the control unit and for transmitting the modulated signals to the second ultrasonic transducer.

2. The system according to claim 1, wherein the underwater cleaning robot further includes a first modem for demodulating the electrical signals corresponding to the received ultrasonic signals and for transmitting the demodulated signals to the control device.

3. The system according to claim 1, in which the communication device is designed to re-emit ultrasonic signals corresponding to the received ultrasonic signals via the first ultrasonic transducer.

4. The system according to claim 1, wherein the underwater cleaning robot further includes a battery for supplying the movement device and/or the cleaning device with electrical energy.

5. The system according to claim 4, wherein the battery is designed to be rechargeable and the underwater cleaning robot further includes external connections, which are connected to the battery, for recharging the battery with electrical energy supplied from outside.

6. A method for controlling an underwater cleaning robot operating below a water surface, comprising the steps of:

converting electrical signals for controlling the underwater cleaning robot into ultrasonic signals by means of a second ultrasonic transducer attached below the water surface, transmitting the ultrasonic signals via an underwater ultrasonic path to the underwater cleaning robot, receiving the transmitted ultrasonic signals and converting the received ultrasonic signals into electrical signals for controlling the underwater cleaning robot by means of a first ultrasonic transducer attached to the underwater cleaning robot, wherein the underwater cleaning robot comprises a movement device for moving the underwater cleaning robot under water, a cleaning device for cleaning an object located under water, a control device for controlling the movement device and/or the cleaning device, and a communication device for receiving and/or transmitting signals from outside the underwater cleaning robot, and vice versa, wherein the communication device includes the first ultrasonic transducer for receiving ultrasonic signals transmitted under water, and wherein the communication device is designed to transmit electrical signals corresponding to the received ultrasonic signals to the control device.

7. The method according to claim 6, in which the electrical signals for controlling the underwater cleaning robot are modulated by means of a second modem before being converted into ultrasonic signals, and the electrical signals output by the first ultrasonic transducer are demodulated by means of a first modem (26).

8. The method according to claim 7, in which a multitone modulation is used for modulation, with 50 tones at intervals of about 100 Hz, wherein each single tone is modulated using a frequency shift keying (FSK).

9. The method according to claim 7, in which a multitone modulation is used for modulation, with 50 tones at intervals of about 100 Hz, wherein each single tone is modulated using a frequency shift keying (FSK), with a deviation of about 25 Hz.

10. The method according to claim 7, in which a multitone modulation is used for modulation.

11. The method according to claim 6, in which data packets with a predetermined number of bits are sent out for transmission.

12. The method according to claim 11, wherein a predetermined guard time is maintained between the transmission of successive data packets to compensate for reflections of the ultrasonic signals.

13. The method according to claim 6, in which a data transmission takes place both from a control unit to the underwater cleaning robot and from the underwater cleaning robot to the control unit, wherein a modem, which is included in or connected to the control unit, modulates the signals output by the control unit and transmits the modulated signals to the second ultrasonic transducer.

14. The method according to claim 13, in which the data transmission is half-duplex in two separate frequency bands of a predetermined bandwidth, or the data transmission is simplex in a frequency band of a predetermined bandwidth.

15. The method according to claim 6, in which the underwater cleaning robot turns around when the reception of the ultrasonic signals becomes too weak or fails and moves back to where it had better reception before, and/or the underwater cleaning robot stops when the reception of the ultrasonic signals fails and waits until ultrasonic signals are received again, and/or the underwater cleaning robot automatically returns to the starting position when the remaining capacity of the battery falls below a predetermined value, and/or the underwater cleaning robot automatically returns to the starting position after completion of the cleaning.

16. The method according to claim 6, in which the ultrasonic signals are used for distance measurements and for supporting the navigation of the underwater cleaning robot in the pool, and/or the ultrasonic transducers are used for collecting data relating to water and pool quality.

17. The method according to claim 6, in which for the surfacing of underwater cleaning robot, air is sucked in from above the water surface and pumped into a surfacing bell and/or for the surfacing of the underwater cleaning robot, air compressed by an air expansion cartridge is released into the surfacing bell and/or for the descending of the underwater cleaning robot, the air in the surfacing bell is sucked out by a suction pump.

18. A system for underwater cleaning, including two or more underwater cleaning robots, a control unit for controlling the underwater cleaning robots, a second ultrasonic transducer, which is connected to the control unit, for converting signals output by the control unit into ultrasonic signals and for emitting the ultrasonic signals under water, and a modem, which is included in or connected to the control unit, for modulating the signals output by the control unit and for transmitting the modulated signals to the second ultrasonic transducer, wherein each of the two or more underwater cleaning robots comprises a movement device for moving the underwater cleaning robot under water, a cleaning device for cleaning an object located under water, a control device for controlling the movement device and/or the cleaning device, and a communication device for receiving and/or transmitting signals from outside the underwater cleaning robot, and vice versa, wherein the communication device includes a first ultrasonic transducer for receiving ultrasonic signals transmitted under water, and wherein the communication device is designed to transmit electrical signals corresponding to the received ultrasonic signals to the control device.

* * * * *